United States Patent
Aoki et al.

(10) Patent No.: US 8,498,521 B2
(45) Date of Patent: Jul. 30, 2013

(54) VIDEO REPRODUCTION METHOD AND VIDEO REPRODUCTION DEVICE

(75) Inventors: Takashi Aoki, Kyoto (JP); Katsuhiro Okawara, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/412,785

(22) Filed: Mar. 6, 2012

(65) Prior Publication Data

US 2012/0163778 A1    Jun. 28, 2012

Related U.S. Application Data

(63) Continuation of application No. PCT/JP2011/001862, filed on Mar. 29, 2011.

(30) Foreign Application Priority Data

Jun. 7, 2010    (JP) ................. 2010-130531

(51) Int. Cl.
  *H04N 5/783*    (2006.01)
  *H04N 9/80*    (2006.01)
  *H04N 5/7822*    (2006.01)
  *H04N 5/77*    (2006.01)
  *H04N 5/93*    (2006.01)

(52) U.S. Cl.
  USPC ........... 386/343; 386/226; 386/239; 386/241; 386/290; 386/318; 386/322; 386/344; 386/345; 386/346; 386/351

(58) Field of Classification Search
  USPC ................. 386/226, 239, 241, 290, 318, 322, 386/343, 344, 345, 346, 351
  See application file for complete search history.

(56) References Cited

U.S. PATENT DOCUMENTS

| | | | | |
|---|---|---|---|---|
| 5,157,513 A | * | 10/1992 | Yamashita | 386/207 |
| 5,712,947 A | * | 1/1998 | Oguro et al. | 386/343 |
| 6,085,021 A | * | 7/2000 | Tozaki et al. | 386/239 |

(Continued)

FOREIGN PATENT DOCUMENTS

| | | |
|---|---|---|
| JP | 09-251763 | 9/1997 |
| JP | 11-187354 | 7/1999 |

(Continued)

OTHER PUBLICATIONS

International Search Report issued in International Patent Application No. PCT/JP2011/001862 dated Jun. 28, 2011.

*Primary Examiner* — Daquan Zhao

(74) *Attorney, Agent, or Firm* — McDermott Will & Emery LLP

(57) ABSTRACT

Provided is a video reproduction method with a less difference between a target speed and an actual speed, when fast forward reproduction or fast rewind reproduction is performed on reproduction units consisting of a plurality of connected video units. When the video units are switched, in fast forward reproduction, as an elapsed jump time duration, a difference between a reproduction time of a last displayed picture in a source video unit and an end time of the source video unit is calculated (S104), then, as a remaining jump time duration, a value is calculated by subtracting the calculated elapsed jump time duration from the jump time duration corresponding to the designated speed (S105), then, as a reproduction start time, a time is calculated by adding the calculated remaining time duration to a start time of a destination video unit (S106), and the video is reproduced from the reproduction start time.

12 Claims, 9 Drawing Sheets

U.S. PATENT DOCUMENTS

| | | | |
|---|---|---|---|
| 6,091,674 A | 7/2000 | Tozaki et al. | |
| 6,108,281 A | 8/2000 | Tozaki et al. | |
| 6,181,870 B1 | 1/2001 | Okada et al. | |
| 6,487,364 B2 | 11/2002 | Okada et al. | |
| 6,493,505 B1 | 12/2002 | Okada et al. | |
| 6,560,404 B1 | 5/2003 | Okada et al. | |
| 6,658,439 B2* | 12/2003 | Karasudani | 386/241 |
| 6,678,469 B1* | 1/2004 | Minemura et al. | 386/265 |
| 6,795,641 B2 | 9/2004 | Okada et al. | |
| 6,856,755 B1* | 2/2005 | Lin et al. | 386/241 |
| 7,006,756 B1* | 2/2006 | Keesen et al. | 386/231 |
| 7,043,139 B1* | 5/2006 | Schiller et al. | 386/241 |
| 7,200,321 B2* | 4/2007 | Otala et al. | 386/351 |
| 7,215,876 B2 | 5/2007 | Okada et al. | |
| 7,376,335 B2 | 5/2008 | De Haan | |
| 7,409,399 B2* | 8/2008 | Miyamoto | 386/248 |
| 7,929,845 B2 | 4/2011 | Nagata et al. | |
| 7,944,953 B2* | 5/2011 | Bulkowski et al. | 370/543 |
| 8,238,727 B2* | 8/2012 | Wright | 386/343 |
| 8,244,094 B2* | 8/2012 | Winter et al. | 386/232 |
| 2001/0043799 A1 | 11/2001 | Okada et al. | |
| 2003/0175012 A1 | 9/2003 | Okada et al. | |
| 2003/0231863 A1* | 12/2003 | Eerenberg et al. | 386/68 |
| 2004/0264947 A1 | 12/2004 | Okada et al. | |
| 2005/0141863 A1 | 6/2005 | De Haan | |
| 2007/0172204 A1* | 7/2007 | Shibata | 386/95 |
| 2007/0172208 A1 | 7/2007 | Okada et al. | |
| 2007/0286570 A1 | 12/2007 | Nagata et al. | |
| 2008/0131079 A1* | 6/2008 | Toma et al. | 386/68 |
| 2008/0235583 A1* | 9/2008 | Ostergaard et al. | 715/716 |
| 2008/0317433 A1* | 12/2008 | Hamada | 386/68 |

FOREIGN PATENT DOCUMENTS

| | | |
|---|---|---|
| JP | 2002-232844 | 8/2002 |
| JP | 2004-213728 | 7/2004 |
| JP | 2005-521189 | 7/2005 |
| JP | 2007-305189 | 11/2007 |
| WO | WO 99/14935 A2 | 3/1999 |
| WO | WO 03/079358 A1 | 9/2003 |

* cited by examiner

VIDEO REPRODUCTION METHOD AND VIDEO REPRODUCTION DEVICE

CROSS REFERENCE TO RELATED APPLICATION

This is a continuation application of PCT application No. PCT/JP2011/001862 filed on Mar. 29, 2011, designating the United States of America, which is based on and claims priority of Japanese Patent Application No. 2010-130531 filed on Jun. 7, 2010.

TECHNICAL FIELD

The present invention relates to methods and devices for reproducing video recorded on a recording medium or the like.

BACKGROUND ART

In recent years, optical discs have been used to record television programs or record digital camcorder data, or to store such recorded programs or data. In particular, the video data of recorded broadcast programs is stored in an optical disc in a Digital Versatile Disc-Video Recording (DVD-VR) format.

In DVD-VR standard, a plurality of cells, each of which is a unit of a series of moving pictures, can be recorded in a title (program/playlist) that is one reproduction unit which a user can identify.

On a disc in the DVD-VR format, videos having different audio attributes or video attributes can be recorded. If there are a plurality of cells in one title, these cells having different attributes are capable of being reproduced sequentially within one title.

However, if a cell is switched to another within a title, a reproducing video/audio attribute would also be changed, and a physical location of data to be read from the disc would also be changed. Therefore, even within the same title, if a cell is changed to another, the continuity of video is interrupted and reproduction starts next cell as a new video from a start of the cell (regarding the DVD-VR standard, see Patent Literature 1, for example).

CITATION LIST

Patent Literature
Patent Literature 1: Japanese Unexamined Patent Application Publication No. 11-187342

SUMMARY OF INVENTION

Technical Problem

In the conventional DVD-VR reproduction methods, when fast forward reproduction/fast rewind reproduction (fast forward reproduction or fast rewind reproduction) is controlled, a next jump destination can be found based on management information if the jump destination is in the same cell. It is therefore possible to maintain a jump amount corresponding to a designated speed. However, the conventional techniques have the following problems. In conventional fast forward reproduction/fast rewind reproduction, a next cell at a cell boundary is treated as a different new video, so that jumping is resumed from a start/end of the next video (fast forward reproduction from a start, or fast rewind reproduction from an end). Therefore, an actual jump amount is smaller than the jump amount corresponding to the designated speed. As a result, a great difference occurs between the speed setting for fast forward reproduction/fast rewind reproduction and the actual reproduction speed.

The present invention solves the problems of the conventional techniques as described above. It is an object of the present invention to provide a video reproduction method and a video reproduction device each of which is capable of reducing a different between a designated speed and an actual reproduction speed.

Solution to Problem

In accordance with an aspect of the present invention for solving the above-described conventional problem, there is provided a video reproduction method of performing at least one of fast forward reproduction and fast rewind reproduction by sequentially jumping one picture to another in video in a jump time duration corresponding to a designated speed when a reproduction unit is reproduced, the reproduction unit consisting of a plurality of connected video units each being a series of moving pictures, said video reproduction method comprising: calculating an elapsed jump time duration, the elapsed jump time duration being a time duration to be allocated to a source video unit prior to jumping, within a jump time duration for performing a jump across a video unit boundary in fast forward reproduction or fast rewind reproduction; calculating a remaining jump time duration based on the elapsed jump time duration, the remaining jump time duration being a time duration to be allocated to a destination video unit subsequent to the jumping, within the jump time duration for performing the jump across the video unit boundary in fast forward reproduction or fast rewind reproduction; calculating a reproduction start time based on the remaining jump time duration; and reproducing the video from the reproduction start time, wherein when the video units are switched, in fast forward reproduction, in said calculating of the elapsed jump time duration, the elapsed jump time duration is calculated as a difference between a reproduction time of a last displayed picture in a source video unit prior to the switching and an end time of the source video unit, in said calculating of the remaining jump time duration, the remaining jump time duration is calculated by subtracting the elapsed jump time duration calculated in said calculating of the elapsed jump time duration from the jump time duration corresponding to a designated speed, and in said calculating of the reproduction start time, the reproduction start time is calculated by adding the remaining time duration calculated in said calculating of the remaining time duration to a start time of a destination video unit, and in fast rewind reproduction, in said calculating of the elapsed jump time duration, the elapsed jump time duration is calculated as a difference between a reproduction time of a last displayed picture in a source video unit prior to the switching and a start time of the source video unit, in said calculating of the remaining jump time duration, the remaining jump time duration is calculated by subtracting the elapsed jump time duration calculated in said calculating of the elapsed jump time duration from the jump time duration corresponding to a designated speed, and in said calculating of the reproduction start time, the reproduction start time is calculated by subtracting the remaining time duration calculated in said calculating of the remaining time duration from an end time of a destination video unit.

Thereby, in the reproduction method of performing fast forward reproduction or fast rewind reproduction by sequentially jumping one picture to another in video in a jump time duration corresponding to a designated speed, the jump time duration can be maintained to correspond to the designated speed when video units are switched. As a result, it is possible to reduce a difference between the designated speed and an actual reproduction speed.

It is further possible that the video reproduction method further includes calculating a switch correction time duration by multiplying a difference by a factor corresponding to the designated speed, the difference being between (a) an actual time of reproducing a picture to be last displayed in the source video unit prior to the switching and (b) an actual time of reproducing a picture to be first displayed in the destination video unit, wherein when the destination video unit is switched to a further destination video unit, in fast forward reproduction, said calculating of the reproduction start time further includes calculating the reproduction start time by adding the switch correct time duration calculated in said calculating of the switch correct time duration to a start time of the further destination video unit, and in fast rewind reproduction, said calculating of the reproduction start time further includes calculating the reproduction start time by subtracting the switch correct time duration calculated in said calculating of the switch correct time duration from an end time of the further destination video unit.

Thereby, in the reproduction method of performing fast forward reproduction or fast rewind reproduction by sequentially jumping one picture to another in video in a jump time duration corresponding to a designated speed, a time duration required to switch video units can be absorbed by correcting the reproduction start time. As a result, it is possible to reduce a difference between the designated speed and an actual reproduction speed.

It is further possible that in fast forward reproduction, said calculating of the reproduction start time further includes calculating the reproduction start time by adding (a) a sum of the remaining jump time duration and the switch correct time duration to (b) the start time of the destination video unit, and in fast rewind reproduction, said calculating of the reproduction start time further includes calculating the reproduction start time by subtracting (a) the sum of the remaining jump time duration and the switch correct time duration from (b) the end time of the destination video unit.

Thereby, in the reproduction method of performing fast forward reproduction or fast rewind reproduction by sequentially jumping one picture to another in video in a jump time duration corresponding to a designated speed, the jump time duration can be maintained to correspond to the designated speed when video units are switched. In addition, a time duration required to switch video units can be absorbed by correcting the jump time duration. As a result, it is possible to reduce a difference between the designated speed and an actual reproduction speed.

It is still further possible that when the remaining jump time duration calculated in said calculating of the remaining jump time duration is longer than at least one of a reproduction time duration of the destination video unit and a total reproduction time duration of consecutive destination video units, in fast forward reproduction, in said reproducing, one of the destination video unit and the consecutive destination video units is not reproduced, and said calculating of the reproduction start time further includes calculating the reproduction start time by adding a time duration to a start time of the one of the destination video unit and the consecutive destination video units, the time duration being calculated by subtracting (a) the one of the reproduction time duration of the destination video unit and the total reproduction time duration of the consecutive destination video units from (b) the remaining jump time duration, and in fast rewind reproduction, in said reproducing, the one of the destination video unit and the consecutive destination video units is not reproduced, and said calculating of the reproduction start time further includes calculating the reproduction start time by subtracting the time duration from an end time of the one of the destination video unit and the consecutive destination video units, the time duration being calculated by subtracting (a) the one of the reproduction time duration of the destination video unit and the total reproduction time duration of the consecutive destination video units from (b) the remaining jump time duration.

Thereby, in the reproduction method of performing fast forward reproduction or fast rewind reproduction by sequentially jumping one picture to another in video in a jump time duration corresponding to a designated speed, the jump time duration can be maintained to correspond to the designated speed even if there are a plurality of video units each having a time duration shorter than the jump time duration corresponding to the designated speed. As a result, it is possible to reduce a difference between the designated speed and an actual reproduction speed.

It is still further possible that when the switch correction time duration calculated in said calculating of the switch correction time duration is longer than at least one of a reproduction time duration of the destination video unit and a total reproduction time duration of consecutive destination video units, in fast forward reproduction, in said reproducing, the one of the destination video unit and the consecutive destination video units is not reproduced, and said calculating of the reproduction start time further includes calculating the reproduction start time by adding a time duration to a start time of the one of the destination video unit and the consecutive destination video units, the time duration being calculated by subtracting (a) the one of the reproduction time duration of the destination video unit and the total reproduction time duration of the consecutive destination video units from (b) the switch correction time duration, in fast rewind reproduction, in said reproducing, the one of the destination video unit and the consecutive destination video units is not reproduced, and said calculating of the reproduction start time further includes calculating the reproduction start time by subtracting the time duration from an end time of the one of the destination video unit and the consecutive destination video units, the time duration being calculated by subtracting (a) the one of the reproduction time duration of the destination video unit and the total reproduction time duration of the consecutive destination video units from (b) the switch correction time duration.

Thereby, in the reproduction method of performing fast forward reproduction or fast rewind reproduction by sequentially jumping one picture to another in video in a jump time duration corresponding to a designated speed, a time duration required to switch video units can be absorbed by correcting the reproduction start time even if there are a plurality of video units each having a time duration shorter than the switch correct time duration. As a result, it is possible to reduce a difference between the designated speed and an actual reproduction speed.

It is still further possible that when a sum of the remaining jump time duration and the switch correct time duration is longer than at least one of a reproduction time duration of the destination video unit and a total reproduction time duration of consecutive destination video units, in fast forward reproduction, in said reproducing, the one of the destination video unit and the consecutive destination video units is not reproduced, and said calculating of the reproduction start time further includes calculating the reproduction start time by adding a time duration to a start time of the one of the destination video unit and the consecutive destination video units, the time duration being calculated by subtracting (a) the one of the reproduction time duration of the destination video unit and the total reproduction time duration of the consecutive destination video units from (b) the sum of the remaining jump time duration and the switch correct time duration, and in fast rewind reproduction, in said reproducing, the one of the destination video unit and the consecutive destination video units is not reproduced, and said calculating of the reproduction start time further includes calculating the reproduction start time by subtracting the time duration from an end time of the one of the destination video unit and the consecutive destination video units, the time duration being calculated by subtracting (a) the one of the reproduction time duration of the destination video unit and the total reproduction time duration of the consecutive destination video units from (b) the sum of the remaining jump time duration and the switch correct time duration.

Thereby, in the reproduction method of performing fast forward reproduction or fast rewind reproduction by sequentially jumping one picture to another in video in a jump time duration corresponding to a designated speed, the jump time duration can be maintained to correspond to the designated speed when video units are switched. In addition, a time duration required to switch video units can be absorbed by correcting the jump time duration. Therefore, the jump time duration and an elapsed time duration can be maintained to correspond to the designated speed, even if there are a plurality of video units each having a time duration shorter than the jump time duration corresponding to the designated speed or even if there are a plurality of video units having a time duration shorter than the switch correct time duration that is a time duration calculated by performing multiplication by a factor corresponding to the designated speed. As a result, it is possible to reduce a difference between the designated speed and an actual reproduction speed.

It should be noted that the present invention can be implemented not only as the above-described video reproduction method, but also as: a program causing a computer to execute steps included in the video reproduction method; a non-transitory computer-readable recording medium, such as a DVD, on which the program is recorded; a video reproduction device; a semiconductor integrated circuit such as a Large Scale Integration (LSI); and the like.

Advantageous Effects of Invention

In the fields of the method for performing fast forward reproduction or fast rewind reproduction by sequentially jumping one picture to another in video at a designated speed, the video reproduction method and video reproduction device according to the present invention can (i) maintain a jump time duration to correspond to the designated speed when video units are switched, and (ii) maintain the jump time duration and an elapsed time duration corresponding to the designated speed, by absorbing a time duration required to switch video units by changing the jump time duration. As a result, it is possible to reduce a difference between the designated speed and an actual reproduction speed.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings.

DESCRIPTION OF EMBODIMENT

The following describes the embodiment of the present invention according to the present invention with reference to the drawings. It is hereinafter assumed that an optical disc conforming to DVD-VR standard is used as a recording medium on which one reproduction unit (here, a title) consisting of a plurality of connected video units (here, cells) each of which is a series of moving pictures is recorded.

Figure 1:
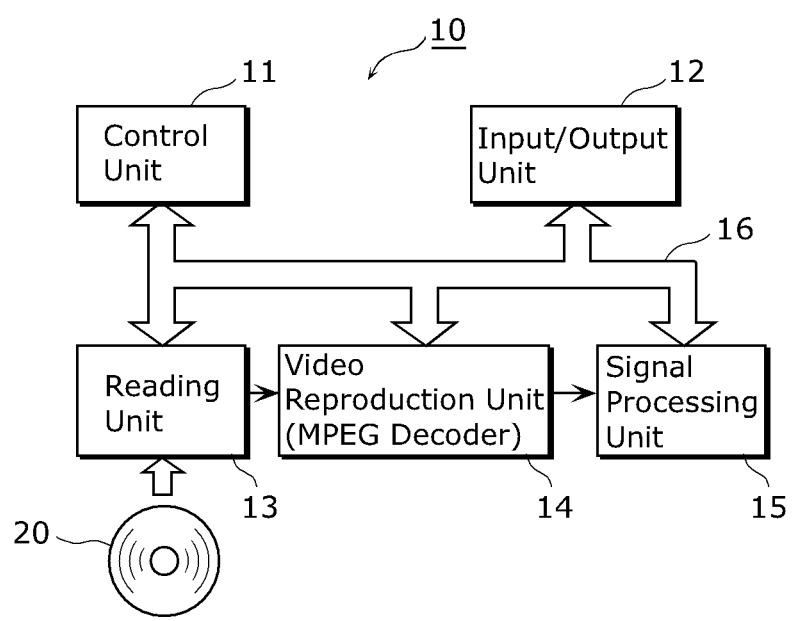
FIG. 1 is a functional block diagram showing a structure of a video reproduction device according to an embodiment of the present invention.

FIG. 1 is a functional block diagram showing a structure of a video reproduction device 10 according to the embodiment of the present invention. The video reproduction device 10 is a device that reads video from a recording medium such as a DVD on which the video is recorded according to DVD-VR standard and then reproduces the video. The video reproduction device 10 includes a control unit 11, an input/output unit 12, a reading unit 13, a video reproduction unit 14, and a signal processing unit 15, which are connected by a bus 16 to one another.

The control unit 11 includes a Central Processing Unit (CPU), a Read Only Memory (ROM) on which a control program is stored, a Random Access Memory (RAM), and the like. The control unit 11 controls each of the structural elements (the input/output unit 12, the reading unit 13, the video reproduction unit 14, and the signal processing unit 15) via the bus 16.

The input/output unit 12 is an interface circuit providing a dialog function for a user. The input/output unit 12 obtains instructions (fast forward reproduction, fast rewind reproduction, designated speed, or the like) from the user via a remote controller, buttons, or the like. Furthermore, the input/output unit 12 displays various information on a front panel (not shown) such as a Liquid Crystal Display (LCD). The input/output unit 12 transmits video signals such as an operation menu to a television connected as an external device.

The reading unit 13 is a processing unit or the like that reads the video (compressed video and audio) recorded on the recording medium 20, and provides the video to the video reproduction unit 14. The reading unit 13 includes an optical head, a driven structure for the optical head, a circuit for demodulating readout signals, and the like.

The video reproduction unit 14 is an MPEG decoder that decodes the video provided from the reading unit 13 and provides the video to the signal processing unit 15.

The signal processing unit 15 includes an analog-digital (A/D) converter, an amplifier, or the like, which converts video provided from the video reproduction unit 14 into video signals and audio signals and outputs the signals from an external terminal.

Figure 2:
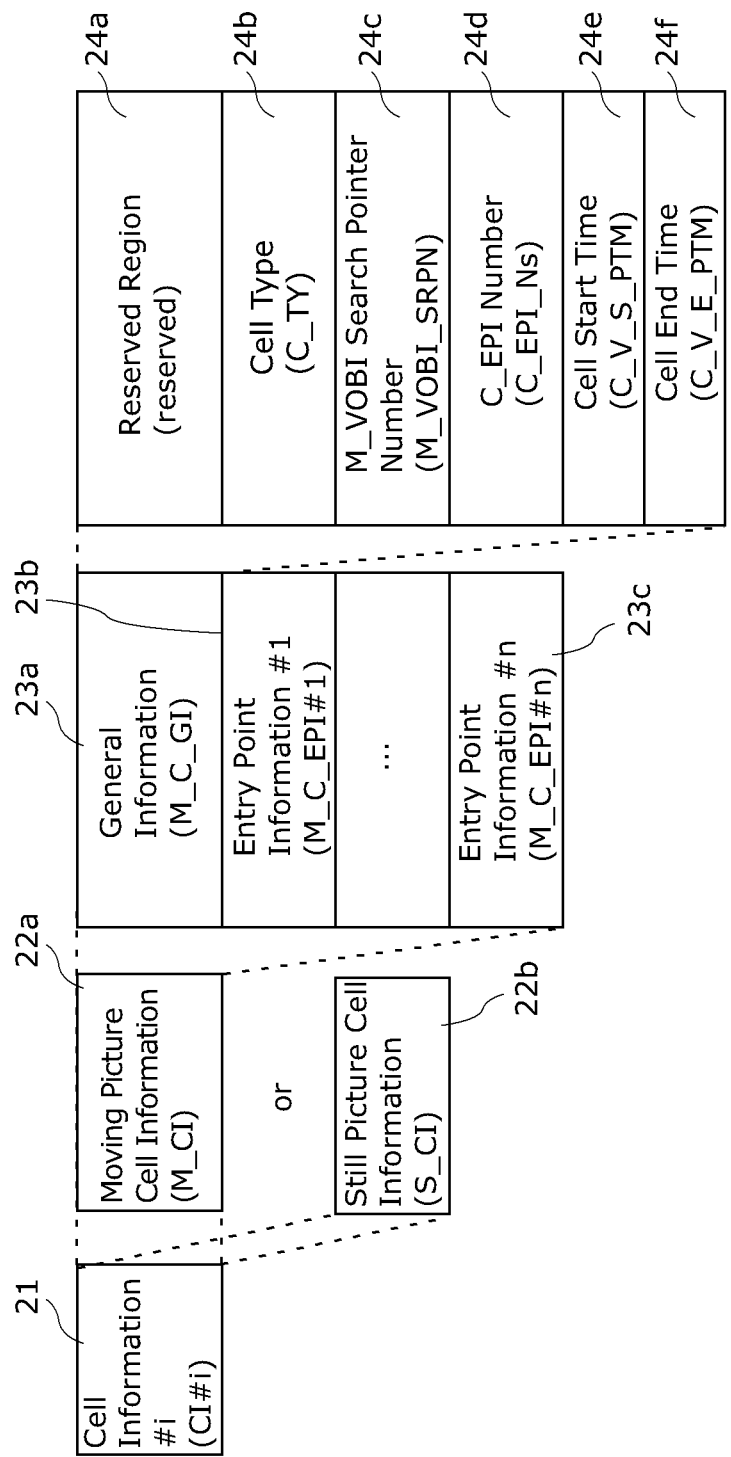
FIG. 2 is a diagram showing pieces of information in a cell in DVD-VR format.

FIG. 2 is a diagram showing a structure of cell information stored in the recording medium 20 shown in FIG. 1. Here, a data structure of cell information regarding one (CELL#1) of a plurality of cells included in the video stored in the recording medium 20 is shown.

Cell information #i (CI#i) 21 is classified into moving picture cell information (M_CI) 22a or still picture cell information (S_CI) 22b.

The moving picture cell information (M_CI) 22a includes general information (M_C_GI) 23a and entry point information #1 (M_C_EPI#1) 23b to entry point information #n (M_C_EPI#n) 23c. Here, each of the entry point information #1 (M_C_EPI#1) 23b to entry point information #n (M_C_EPI#n) 23c is information indicating location of the target CELL#i in a program chain defining an order of reproducing cells.

The general information (M_C_GI) 23a includes a reserved region (reserved) 24a, a cell type (C_TY) 24b, a M_VOBI search pointer number (M_VOBI_SRPN) 24c, a C_EPI number (C_EPI_Ns) 24d, a cell start time (C_V_S_PTM) 24e, and a cell end time (C_V_E_PTM) 24f.

Reserved region (reserved) 24a is a recording region reserved for a future use.

Cell type (C_TY) 24b is information indicating a type of the cell.

M_VOBI search pointer number (M_VOBI_SRPN) 24c is information regarding location of Video Object Unit (VOBU) included in the target cell. VOBU is a video unit ranging from 0.4 seconds to 1.2 seconds. VOBU includes one or more Group of Pictures (GOPs) in a MPGE-2 format.

C_EPI number (C_EPI_Ns) 24d is information indicating a total number (n) of the entry point information #1 (M_C_EPI#1) 23b to the entry point information #n (M_C_EPI#n) 23c.

Cell start time (C_V_S_PTM) 24e is information indicating a start time of a target cell.

Cell end time (C_V_E_PTM) 24f is information indicating an end time of the target cell.

Figure 3:
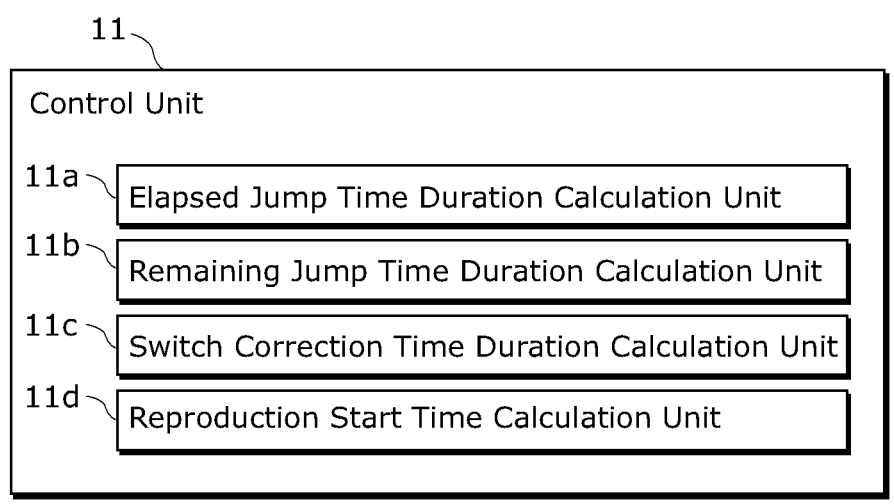
FIG. 3 is a diagram showing a detailed functional structure of a control unit shown in FIG. 1.

FIG. 3 is a diagram showing a detailed functional structure of the control unit 11 shown in FIG. 1. In order to control fast forward reproduction and fast rewind reproduction according to the embodiment of the present invention, the control unit 11 includes an elapsed jump time duration calculation unit 11a, a remaining jump time duration calculation unit 11b, a switch correction time duration calculation unit 11c, and a reproduction start time calculation unit 11d.

The control unit 11 controls the reading unit 13 and the video reproduction unit 14 in fast forward reproduction and fast rewind reproduction. Thereby, the control unit 11 controls reproduction and display by thinning out a starting I picture of a VOBU included in a cell. For example, under the control of the control unit 11, the video reproduction unit 14 performs reproduction by thinning out every other I picture from among I pictures which are present every 0.5 seconds. As a result, the video reproduction unit 14 performs fast forward reproduction at a double speed. A jump time duration, which is an interval for thinning out picture(s), can be calculated by multiplying an actual time duration for displaying one I picture in the processing by a target speed. In Presentation Time Stamp (PTS) that is a time defined by DVD-VR standard, a minimum unit is defined as 1/90000 seconds. For example, in a television system of 30 fps per frame, if the target speed is a 10-timed speed and ten I pictures are displayed per second (in this case, an actual time duration (seconds) for displaying an I picture is 1/30×10), the jump time duration is expressed by a PTS as 1/30× 10×10×90000=300000.

The elapsed jump time duration calculation unit 11a is a processing unit that calculates an elapsed jump time duration in fast forward reproduction or fast rewind reproduction. Here, the "elapsed jump time duration" is a time duration to be allocated to a source video unit prior to switching, namely, CELL#n−1 (or CELL#n+1), within a jump time duration where a jump is performed from CELL#n−1 (or CELL#n+1) to CELL#n across the boundary of the video units in fast forward reproduction (or fast rewind reproduction).

The remaining jump time duration calculation unit 11b is a processing unit that calculates a remaining jump time duration in fast forward reproduction or fast rewind reproduction. Here, the "remaining jump time duration" is a time duration (namely, a remaining time duration calculated by subtracting the elapsed jump time duration from the jump time duration) to be allocated to a destination video unit subsequent to switching, namely, CELL#n, in the jump time duration where a jump is performed from CELL#n−1 (or CELL#n+1) to CELL#n across the boundary of the video units in fast forward reproduction (or fast rewind reproduction).

The switch correction time duration calculation unit 11c is a processing unit that calculates a switch correction time duration in fast forward reproduction or fast rewind reproduction. Here, the "switch correction time duration" is a time duration calculated by multiplying (a) a difference between (a−1) an actual time of reproducing a picture to be last displayed in CELL#n−1 (or CELL#n+1) and (a−2) an actual time of reproducing a picture to be first displayed in the CELL#n, when switching from CELL#n−1 (or CELL#n+1) to CELL#n in fast forward reproduction or fast rewind reproduction, by (b) a factor corresponding to the designated speed.

The reproduction start time calculation unit 11d calculates a reproduction start time of a cell after switching cells in fast forward reproduction or fast rewind reproduction, based on at least one of: the elapsed jump time duration calculated by the elapsed jump time duration calculation unit 11a, the remaining jump time duration calculated by the remaining jump time duration calculation unit 11b, and the switch correction time duration calculated by the switch correction time duration calculation unit 11c. The control unit 11 controls the video reproduction unit 14 to reproduce the switched cell from the reproduction start time calculated by the reproduction start time calculation unit 11d.

It should be noted that, when cells are switched in fast forward reproduction or fast rewind reproduction, the control unit 11 performs control to reduce a difference between a designated speed and an actual reproduction speed, by using at least one of three kinds of switching methods previously selected by the user. More specifically, the control unit 11 determines a reproduction start time of a switched cell and reproduces the cell at the determined time by using at least one of the three kinds of switching methods. The following describes the three kinds of switching methods.

(First Switching Method)

Figure 4:
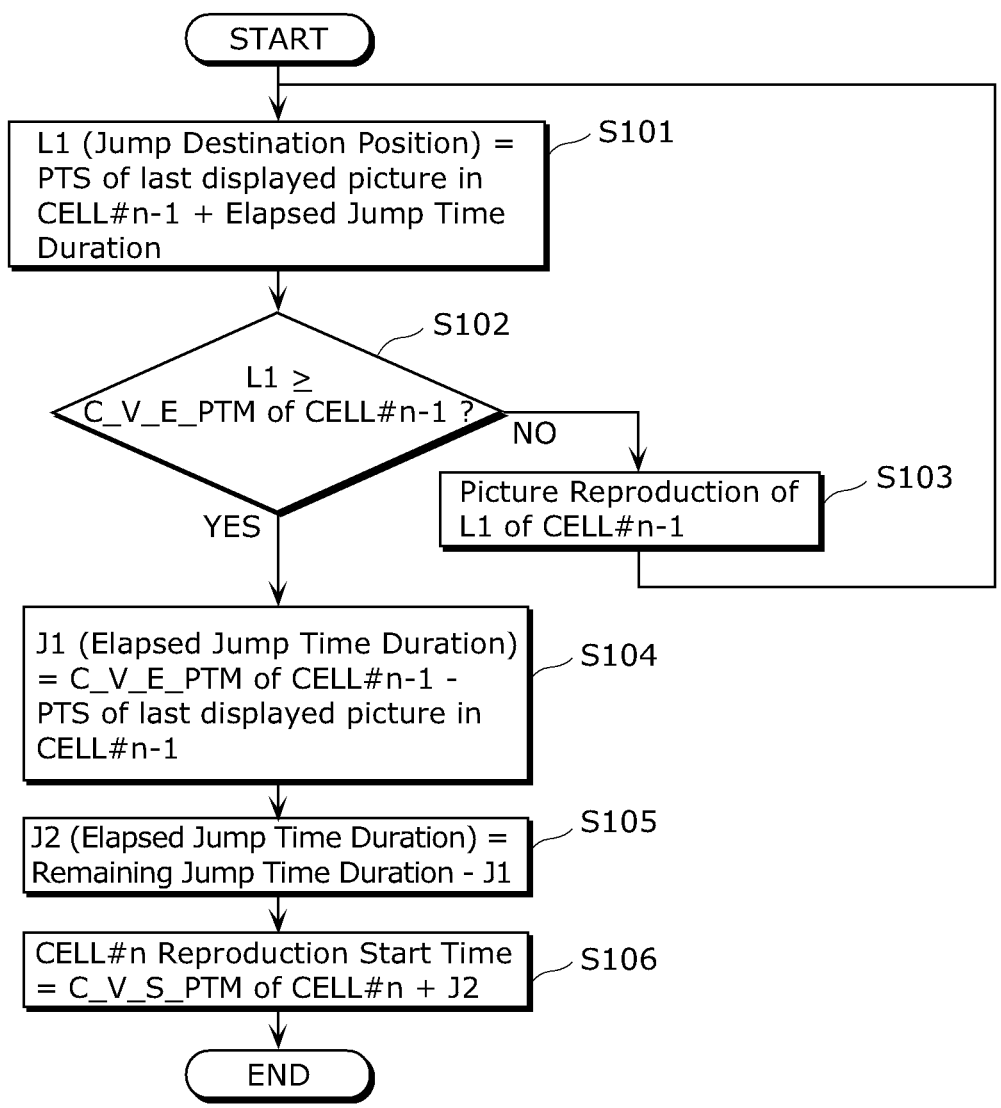
FIG. 4 is a flowchart showing a next reproduction start time determination method in the case where fast forward reproduction switches cells in a forward direction in a first switching method according to the embodiment of the present invention.

FIG. 4 is a flowchart of a method of determining a reproduction start time by the first switching method in the case where fast forward reproduction switches CELL#n−1 to CELL#n across the boundary of the cells that are video units, according to the embodiment of the present invention.

First, at Step S101, the elapsed jump time duration calculation unit 11a assigns a jump destination position to a variable L1. Here, the jump destination position is determined by adding a jump time duration to a PTS of the last displayed picture in the reproduction processing of CELL#n−1.

Next, at Step S102, the elapsed jump time duration calculation unit 11a checks whether or not the variable L1 calculated at S101 is larger than C_V_E_PTM that indicates an end time of CELL#n−1 shown in FIG. 2. If the variable L1 is equal to or larger than C_V_E_PTM (YES at S102), then it is determined that reproduction of CELL#n−1 has been completed, and the processing proceeds to Step S104. On the other hand, if the variable L1 is smaller than C_V_E_PTM (NO at S102), then it is determined that CELL#n−1 is still being reproduced, and the processing proceeds to Step S103.

Next, at Step S103, the video reproduction unit 14 reproduces a picture corresponding to the variable L1 of CELL#n−1, and the processing returns to Step S101.

Next, at Step S104, the elapsed jump time duration calculation unit 11a assigns an elapsed jump time duration to a variable J1. Here, the elapsed jump time duration is calculated by subtracting a PTS of the last displayed picture in CELL#n−1 from C_V_E_PTM of CELL#n−1.

Next, at Step S105, the remaining jump time duration calculation unit 11b assigns a remaining jump time duration to a variable J2. Here, the remaining jump time duration is calculated by subtracting the variable J1 calculated at Step S104 from the jump time duration.

Finally, at Step S106, the reproduction start time calculation unit 11d determines a reproduction start time by adding the variable J2 calculated at Step S105 to C_V_S_PTM indicating a start time of CELL#n shown in FIG. 2.

As described above, by determining the reproduction start time in the case where cells are switched, jump time durations can be kept constant in fast forward reproduction in DVD-VR. As a result, it is expected to reduce a difference between a target speed and an actual speed.

Figure 5:
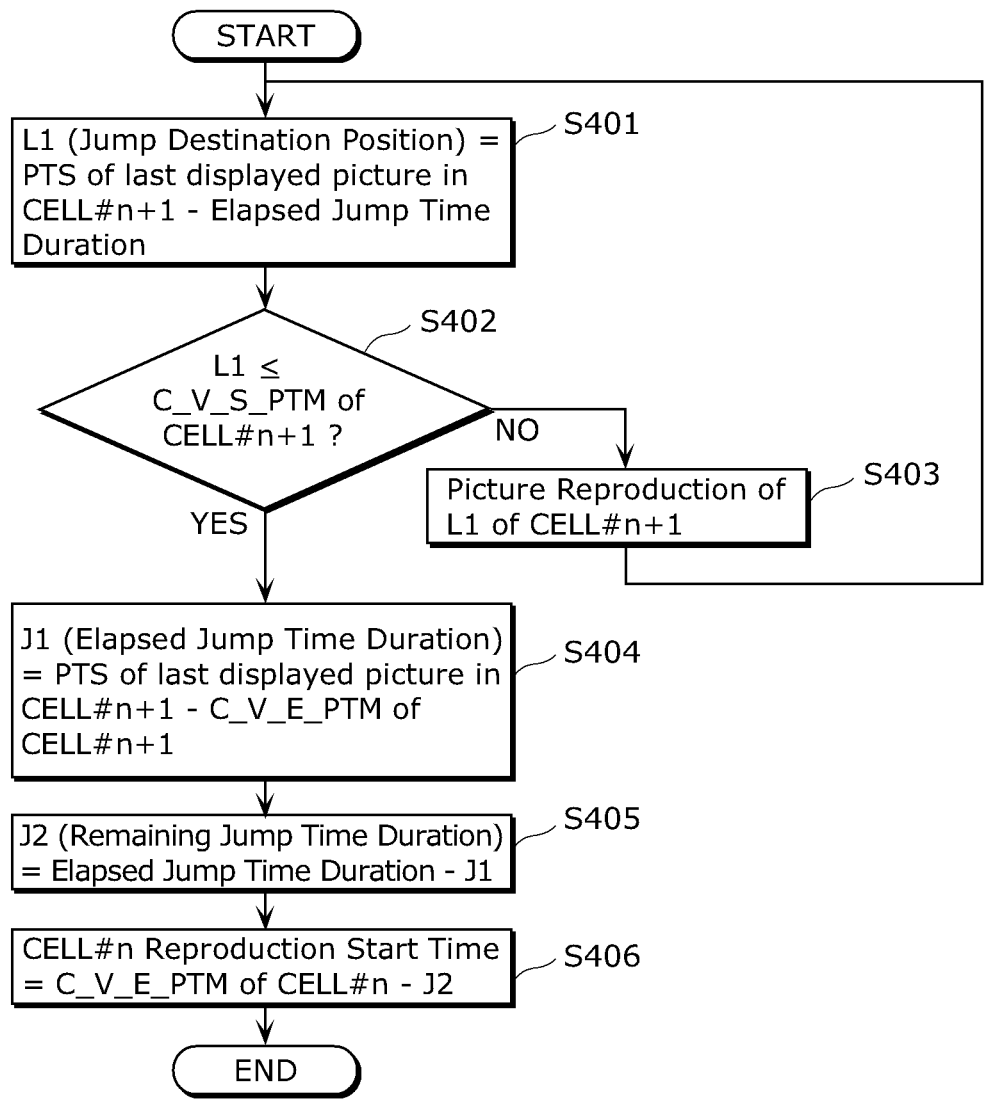
FIG. 5 is a flowchart showing a next reproduction start time determination method in the case where fast rewind reproduction switches cells in a backward direction in the first switching method according to the embodiment of the present invention.

FIG. 5 is a flowchart of a method of determining a reproduction start time by the first switching method in the case where fast rewind reproduction switches CELL#n+1 to CELL#n, according to the embodiment of the present invention.

First, at Step S401, the elapsed jump time duration calculation unit 11a assigns a jump destination position to a variable L1. Here, the jump destination position is determined by subtracting a jump time duration from a PTS of the last displayed picture in the reproduction processing of CELL#n+1.

Next, at Step S402, the elapsed jump time duration calculation unit 11a checks whether or not the variable L1 calculated at S401 is smaller than C_V_E_PTM of CELL#n+1. If the variable L1 is equal to or smaller than C_V_E_PTM (YES at S402), then the elapsed jump time duration calculation unit 11a determines that reproduction of CELL#n+1 has been completed, and then the processing proceeds to Step S404. If the variable L1 is larger than C_V_E_PTM (NO at S402), then the elapsed jump time duration calculation unit 11a determines that CELL#n+1 is still being reproduced, and the processing proceeds to Step S403.

Next, at Step S403, the video reproduction unit 14 reproduces a picture corresponding to the variable L1 of CELL#n+1, and the processing returns to Step S401.

Next, at Step S404, the elapsed jump time duration calculation unit 11a assigns an elapsed jump time duration to a variable J1. Here, the elapsed jump time duration is calculated by subtracting C_V_S_PTM of CELL#n+1 from a PTS of the last displayed picture in CELL#n+1.

Next, at Step S405, the remaining jump time duration calculation unit 11b assigns a remaining jump time duration to a variable J2. Here, the remaining jump time duration is calculated by subtracting the variable J1 calculated at Step S404 from the jump time duration.

Finally, at Step S406, the reproduction start time calculation unit 11d determines a reproduction start time by subtracting the variable J2 calculated at Step S405 from C_V_E_PTM of CELL#n.

As described above, by determining the reproduction start time in the case where cells are switched, jump time durations can be kept constant in fast rewind reproduction in DVD-VR. As a result, it is expected to reduce a difference between a target speed and an actual speed.

(Second Switching Method)

Figure 6:
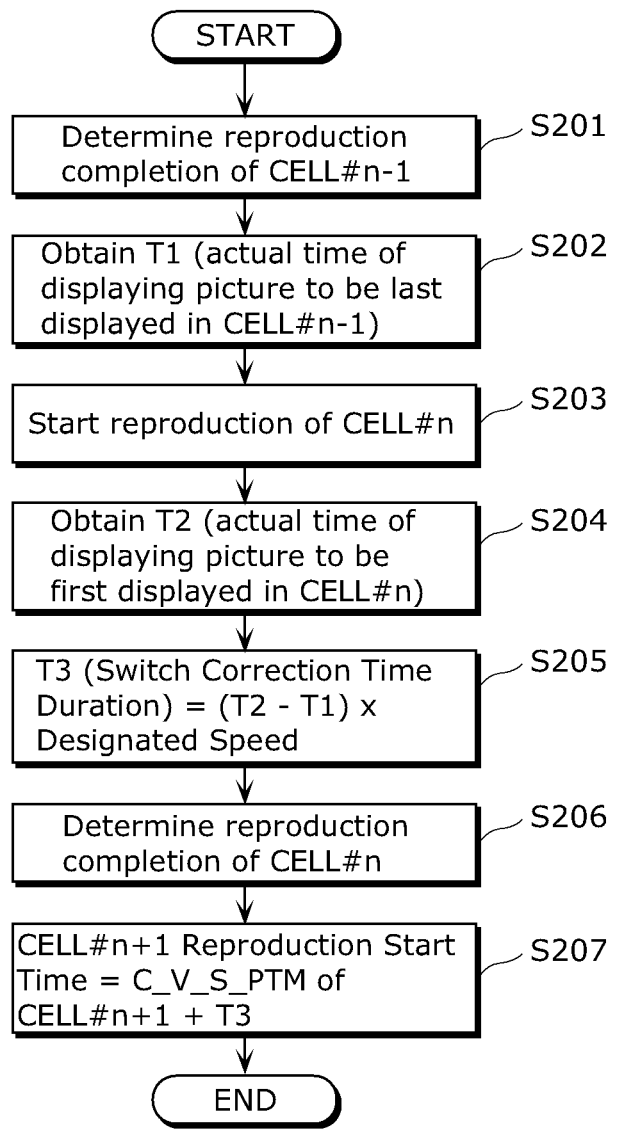
FIG. 6 is a flowchart showing a next reproduction start time determination method in the case where fast forward reproduction switches cells in a forward direction in a second switching method according to the embodiment of the present invention.

FIG. 6 is a flowchart of a method of determining a reproduction start time by the second switching method in the case where fast forward reproduction switches from CELL#n−1 to CELL#n and from CELL#n to CELL#n+1, according to the embodiment of the present invention.

First, at Step S201, the switch correction time duration calculation unit 11c determines whether or not reproduction of CELL#n−1 has been completed, in the same manner as Steps S101, S102, and S103 in the first switching method.

Next, at Step S202, the switch correction time duration calculation unit 11c obtains an actual time of displaying a picture to be last displayed in CELL#n−1, and assigns the actual time to a variable T1.

Next, at Step S203, the video reproduction unit 14 starts reproduction of CELL#n.

Next, at Step S204, the switch correction time duration calculation unit 11c obtains an actual time of displaying a picture to be first displayed in CELL#n, and assigns the actual time to a variable T2.

Next, at Step S205, the switch correction time duration calculation unit 11c assigns a switch correction time duration to a variable T3. The switch correction time duration is calculated by multiplying (a) a result of subtracting the variable T1 calculated at Step S202 from the variable T2 calculated at Step S204 by (b) a speed corresponding to a designated speed.

Next, at Step S206, the reproduction start time calculation unit 11d determines whether or not reproduction of CELL#n has been completed, in the same manner as Steps S101, S102, and S103 in the first switching method.

Finally, at Step S207, the reproduction start time calculation unit 11d determines a reproduction start time by adding the variable T3 calculated at Step S205 to C_V_S_PTM of CELL#n+1.

As described above, by determining the reproduction start time in the case where cells are switched, a time duration required to switch cells can be absorbed in DVD-VR fast forward reproduction. As a result, it is expected to reduce a difference between a target speed and an actual speed.

Figure 7:
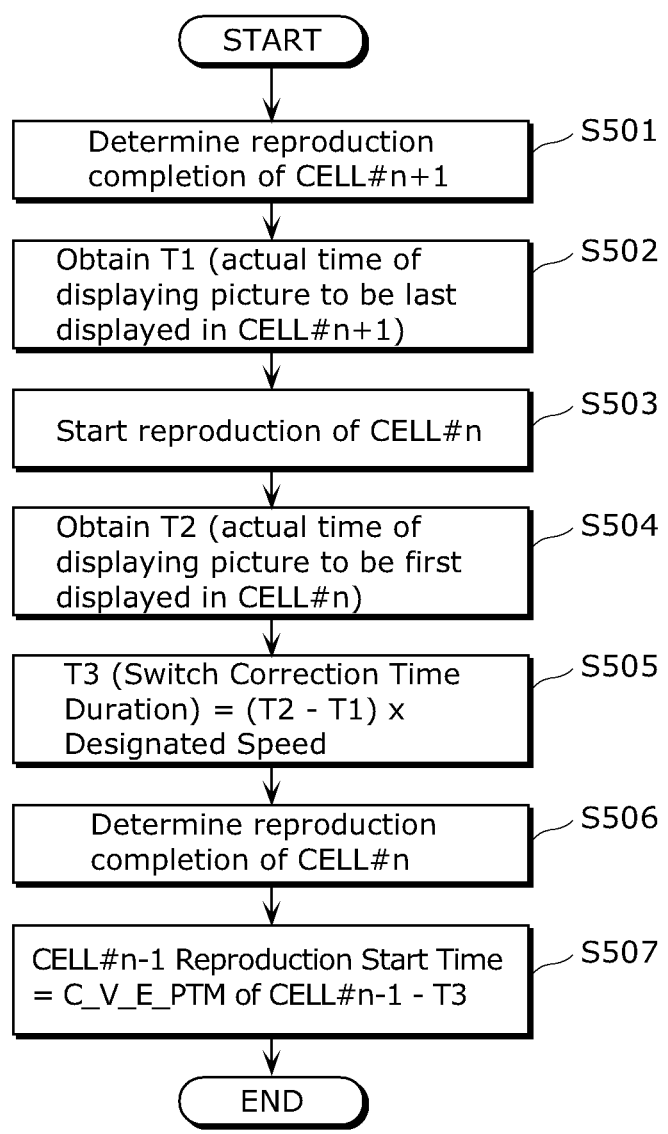
FIG. 7 is a flowchart showing a next reproduction start time determination method in the case where fast rewind reproduction switches cells in a backward direction in the second switching method according to the embodiment of the present invention.

FIG. 7 is a flowchart of a method of determining a reproduction start time by the second switching method in the case where fast rewind reproduction switches from CELL#n+1 to CELL#n and from CELL#n to CELL#n−1, according to the embodiment of the present invention.

First, at Step S501, the switch correction time duration calculation unit 11c determines whether or not reproduction of CELL#n+1 has been completed, in the same manner as Steps S401, S402, and S403 in the first switching method.

Next, at Step S502, the switch correction time duration calculation unit 11c obtains an actual time of displaying a picture to be last displayed in CELL#n+1, and assigns the actual time to a variable T1.

Next, at Step S503, the video reproduction unit 14 starts reproduction of CELL#n.

Next, at Step S504, the switch correction time duration calculation unit 11c obtains an actual time of displaying a picture to be first displayed in CELL#n, and assigns the actual time to a variable T2.

Next, at Step S505, the switch correction time duration calculation unit 11c assigns a switch correction time duration to a variable T3. The switch correction time duration is calculated by multiplying (a) a result of subtracting the variable T1 calculated at Step S502 from the variable T2 calculated at Step S504 by (b) a speed corresponding to a designated speed.

Next, at Step S506, the reproduction start time calculation unit 11d determines whether or not reproduction of CELL#n has been completed, in the same manner as Steps S401, S402, and S403 in the first switching method.

Finally, at Step S507, the reproduction start time calculation unit 11d determines a reproduction start time by subtracting the variable J3 calculated at Step S505 from C_V_E_PTM of CELL#n−1.

As described above, by determining the reproduction start time in the case where cells are switched, a time duration required to switch cells can be absorbed in DVD-VR fast rewind reproduction. As a result, it is expected to reduce a difference between a target speed and an actual speed.

(Third Switching Method)

Figure 8:
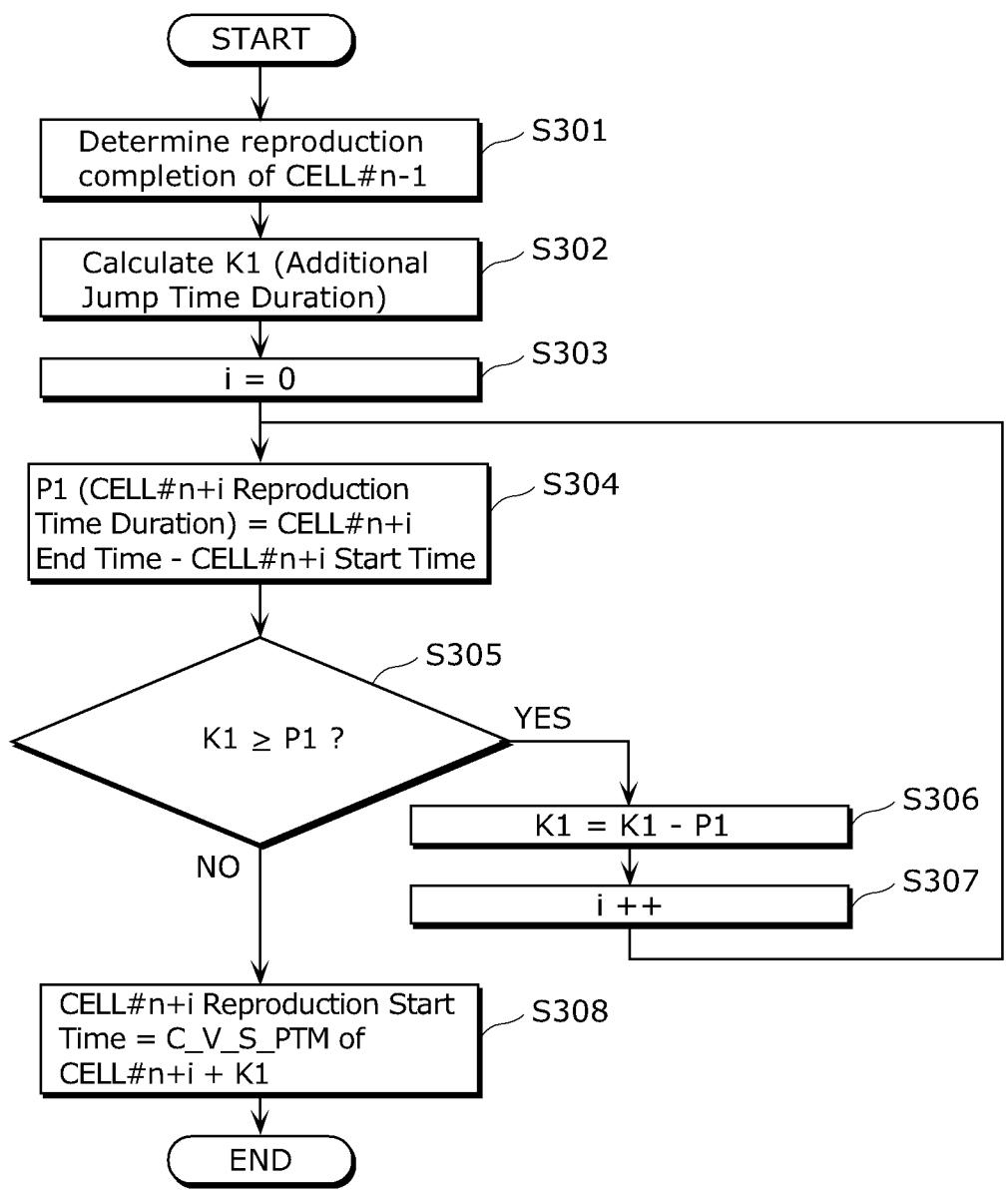
FIG. 8 is a flowchart showing a next reproduction start time determination method in the case where fast forward reproduction switches cells in a forward direction in a third switching method according to the embodiment of the present invention.

FIG. 8 is a flowchart of a method of determining a reproduction start time by the third switching method in the case where fast forward reproduction switches from CELL#n−1 to CELL#n+i, according to the embodiment of the present invention.

First, at Step S301, the reproduction start time calculation unit 11d determines whether or not reproduction of CELL#n−1 has been completed, in the same manner as Steps S101, S102, and S103 in the first switching method.

Next, at Step S302, the reproduction start time calculation unit 11d assigns an additional jump time duration to a variable K1. The additional jump time duration is calculated by adding (a) the variable J2 calculated at Step S105 in the first switching method to (b) the variable T3 calculated at S205 in the second switching method. It should be noted that the value assigned to the variable K1 may be the variable J2 (remaining jump time duration) or the variable T3 (switch correction time duration).

Next, at Step S303, the reproduction start time calculation unit 11d assigns 0 to the variable i to be initialized.

Next, at Step S304, the reproduction start time calculation unit 11d assigns a CELL#n+i reproduction time duration to a variable P1. The CELL#n+i reproduction time duration is calculated by subtracting C_V_S_PTM of CELL#n+i from C_V_E_PTM of CELL#n+i.

Next, at Step S305, the reproduction start time calculation unit 11d checks whether or not the variable K1 is larger than the variable P1. If the variable K1 is equal to or larger than the variable P1 (YES at S305), then the processing proceeds to Step S306. On the other hand, if the variable K1 is smaller than the variable P1 (NO at S305), then the processing proceeds to Step S308.

Next, at Step S306, the reproduction start time calculation unit 11d subtracts the variable P1 from the variable K1 to update the variable K1.

Next, at Step S307, the reproduction start time calculation unit 11d increments the variable i and the processing returns to Step S304.

Finally, at Step S308, the reproduction start time calculation unit 11d adds the variable K1 to C_V_S_PTM of CELL#n+i to determine the reproduction start time.

As described above, by determining the reproduction start time in the case where cells are switched, reproduction of I picture not necessary to be displayed can be eliminated in DVD-VR fast forward reproduction. As a result, it is expected to reduce a difference between a target speed and an actual speed.

Figure 9:
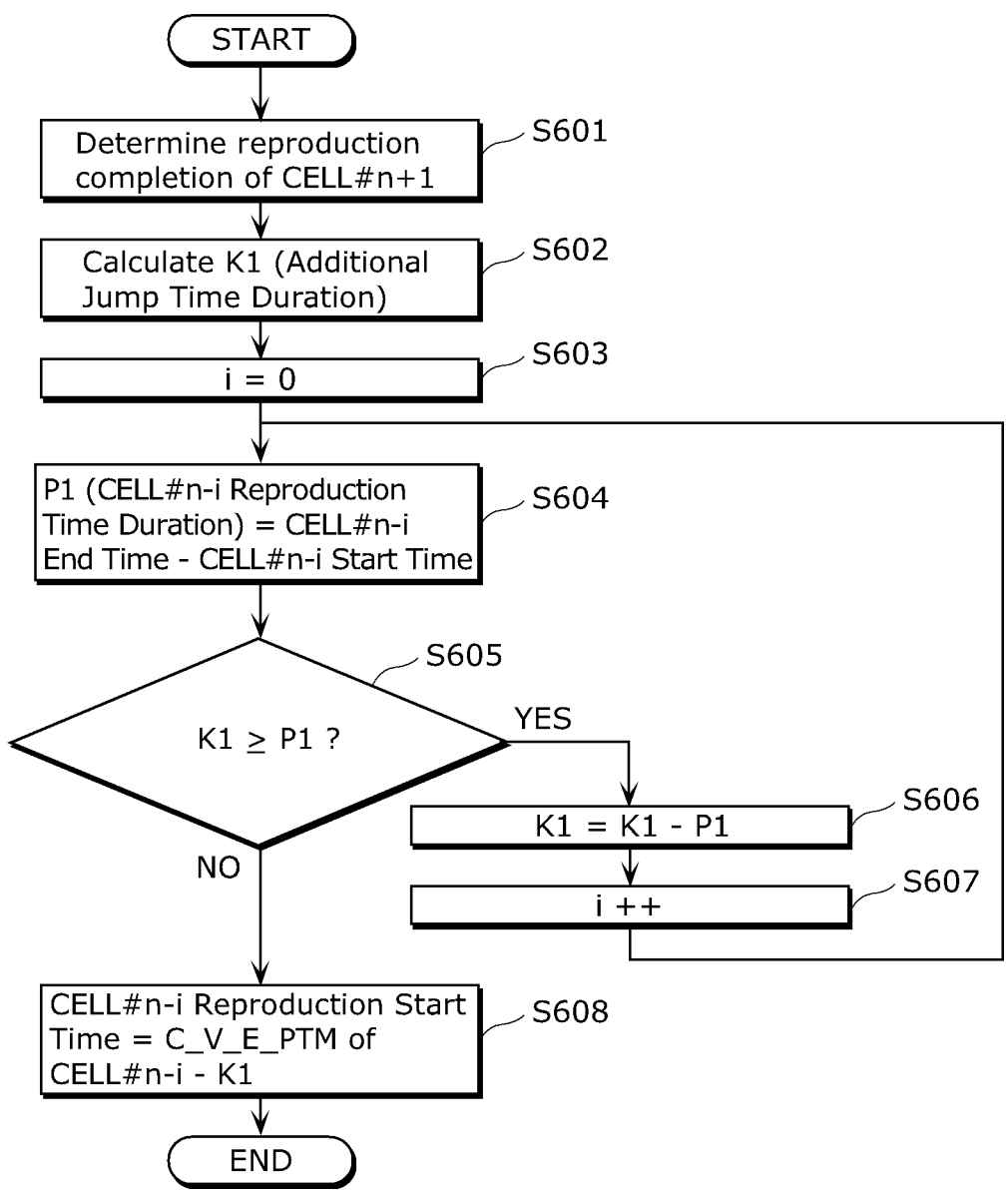
FIG. 9 is a flowchart showing a next reproduction start time determination method in the case where fast rewind reproduction switches cells in a backward direction in the third switching method according to the embodiment of the present invention.

FIG. 9 is a flowchart of a method of determining a reproduction start time by the third switching method in the case where fast rewind reproduction switches CELL#n+1 to CELL#n−i, according to the embodiment of the present invention.

First, at Step S601, the reproduction start time calculation unit 11d determines whether or not reproduction of CELL#n+1 has been completed, in the same manner as Steps S401, S402, and S403 in the first switching method.

Next, at Step S602, the reproduction start time calculation unit 11d assigns an additional jump time duration to a variable K1. The additional jump time duration is calculated by adding (a) the variable J2 calculated at Step S405 in the first switching method to (b) the variable T3 calculated at S505 in the second switching method. It should be noted that the value assigned to the variable K1 may be the variable J2 (remaining jump time duration) or the variable T3 (switch correction time duration).

Next, at Step S603, the reproduction start time calculation unit 11d assigns 0 to the variable i to be initialized.

Next, at Step S604, the reproduction start time calculation unit 11d assigns a CELL#n−i reproduction time duration to a variable P1. The CELL#n−i reproduction time duration is calculated by subtracting C_V_S_PTM of CELL#n-i from C_V_E_PTM of CELL#n−i.

Next, at Step S605, the reproduction start time calculation unit 11d checks whether or not the variable K1 is larger than the variable P1. If the variable K1 is equal to or larger than the variable P1 (YES at S605), then the processing proceeds to Step S606. On the other hand, if the variable K1 is smaller than the variable P1 (NO at S605), then the processing proceeds to Step S608.

Next, at Step S606, the reproduction start time calculation unit 11d subtracts the variable P1 from the variable K1 to update the variable K1.

Next, at Step S607, the reproduction start time calculation unit 11d increments the variable i and the processing returns to Step S604.

Finally, at Step S608, the reproduction start time calculation unit 11d determines the reproduction start time by subtracting the variable K1 from C_V_E_PTM of CELL#n−1.

As described above, by determining the reproduction start time in the case where cells are switched, reproduction of I picture not necessary to be displayed can be eliminated in DVD-VR fast rewind reproduction. As a result, it is expected to reduce a difference between a target speed and an actual speed.

It should be noted that a reproduction start time is determined by the following calculation (1) and (2), when a sum of the remaining jump time duration and the switch correct time duration is larger (longer) than a reproduction time duration of a destination video unit or a set of consecutive destination video units by the jump processing (Steps S306 and S307) in fast forward reproduction and the jump processing (Steps S606 and S607) in fast forward reproduction. (i) In the case of fast forward reproduction, without reproducing the destination video unit or the set of consecutive destination video units, a reproduction start time is determined by adding a time duration, which is calculated by subtracting the reproduction time duration of the destination video unit or the set of consecutive destination video units from the sum of the remaining jump time duration and the switch correct time duration, to a start time of a video unit that is a destination of the destination video unit or the set of consecutive destination video units. On the other hand, (ii) in the case of fast rewind reproduction, without reproducing the destination video unit or the set of consecutive destination video units, a reproduction start time is determined by subtracting a time duration, which is calculated by subtracting the reproduction time duration of the destination video unit or the set of consecutive destination video units from the sum of the remaining jump time duration and the switch correct time duration, from an end time of a video unit that is a destination of the destination video unit or the set of consecutive destination video units. Therefore, in the reproduction method of performing fast forward reproduction or fast rewind reproduction for repeatedly jumping one picture to another picture in video at a designated speed, if there are a plurality of video units each having a time duration shorter than a jump time duration corresponding to the designated speed or if there are a plurality of video units each having a time duration shorter than the switch correct time duration that is a time duration calculated by executing multiplication by a factor corresponding to the designated speed, it is possible to maintain a jump time duration and an elapsed time duration to correspond to the designated speed. As a result, it is possible to reduce a difference between the designated speed and an actual speed.

It should also be noted at Steps S302 and S602 that, as described previously, a value assigned to the variable K1 may be the variable J2 (remaining jump time duration) or the variable T3 (switch correct time duration). If the variable 2 (remaining jump time duration) is assigned to the variable K1, the following is performed by the jump processing (Steps S306 and S307) in fast forward reproduction and the jump processing (Steps S606 and S607) in fast rewind reproduction.

More specifically, when the remaining jump time duration is larger (longer) than a reproduction time duration of a destination video unit or a set of consecutive destination video units, the following is performed. (1) In the case of fast forward reproduction, without reproducing the destination video unit or the set of consecutive destination video units, a reproduction start time is determined by adding a time duration, which is calculated by subtracting the reproduction time duration of the destination video unit or the set of consecutive destination video units from the remaining jump time duration, to a start time of a video unit that is a destination of the destination video unit or the set of consecutive destination video units. On the other hand, (2) in the case of fast rewind reproduction, without reproducing the destination video unit or the set of consecutive destination video units, a reproduction start time is determined by subtracting a time duration, which is calculated by subtracting the reproduction time duration of the destination video unit or the set of consecutive destination video units from the remaining jump time duration, from an end time of a video unit that is a destination of the destination video unit or the set of consecutive destination video units. Therefore, in the reproduction method of performing fast forward reproduction or fast rewind reproduction for repeatedly jumping one picture to another picture in video at a designated speed, if there are a plurality of video units each having a time duration shorter than a jump time duration corresponding to the designated speed, it is possible to maintain the jump time duration to correspond to the designated speed. As a result, it is possible to reduce a difference between the designated speed and an actual speed.

If the variable T3 (switch correction time duration) is assigned to the variable K1, the following is performed by the jump processing (Steps S306 and S307) in fast forward reproduction and the jump processing (Steps S606 and S607) in fast rewind reproduction.

More specifically, when the switch correction time duration is larger (longer) than a reproduction time duration of a destination video unit or a set of consecutive destination video units, the following is performed. (1) In the case of fast forward reproduction, without reproducing the destination video unit or the set of consecutive destination video units, a reproduction start time is determined by adding a time duration, which is calculated by subtracting the reproduction time duration of the destination video unit or the set of consecutive destination video units from the switch correction time duration, to a start time of a video unit that is a destination of the destination video unit or the set of consecutive destination video units.

On the other hand, (2) in the case of fast rewind reproduction, without reproducing the destination video unit or the set of consecutive destination video units, a reproduction start time is determined by subtracting a time duration, which is calculated by subtracting the reproduction time duration of the destination video unit or the set of consecutive destination video units from the switch correction time duration, from an end time of a video unit that is a destination of the destination video unit or the set of consecutive destination video units. Therefore, in the reproduction method of performing fast forward reproduction or fast rewind reproduction for repeatedly jumping one picture to another picture in video at a designated speed, if there are a plurality of video units each having a time duration shorter than the switch correction time duration, it is possible to absorb a time duration required to switch video units by correcting the reproduction start time. As a result, it is possible to reduce a difference between the designated speed and an actual speed.

Although the video reproduction device and video reproduction method according to the present invention have been described with reference to the embodiment as above, the present invention is not limited to the embodiment.

For example, those skilled in the art will be readily appreciated that various modifications and combinations of the structural elements are possible in the exemplary embodiment. Such modifications and combinations are also embodiments of the present invention.

Although the above embodiment has been described as the video reproduction device, the video reproduction method according to the present invention can be used not only by reproduction devices having only a video reproduction function but also by recording/reproduction devices having both a video recording function and a video reproduction function.

INDUSTRIAL APPLICABILITY

As described above, the present invention can realize fast forward reproduction or fast rewind reproduction at a more accurate speed for reproduction units each, for example, consisting of a plurality of connected video units. The present invention is useful to be applied in video reproduction devices embedded in DVD recorders, digital camcorders, and the like which require high usability enabling speedy, accurate, and easy access to a target scene while confirming contents of the video.

The invention claimed is:

1. A video reproduction method of performing at least one of fast forward reproduction and fast rewind reproduction by sequentially jumping one picture to another in video in a jump time duration corresponding to a designated speed when a reproduction unit is reproduced, the reproduction unit consisting of a plurality of connected video units each being a series of moving pictures, said video reproduction method comprising:
    calculating an elapsed jump time duration, the elapsed jump time duration being a time duration to be allocated to a source video unit prior to jumping, within a jump time duration for performing a jump across a video unit boundary in fast forward reproduction or fast rewind reproduction;
    calculating a remaining jump time duration based on the elapsed jump time duration, the remaining jump time duration being a time duration to be allocated to a destination video unit subsequent to the jumping, within the jump time duration for performing the jump across the video unit boundary in fast forward reproduction or fast rewind reproduction;
    calculating a reproduction start time based on the remaining jump time duration; and
    reproducing the video from the reproduction start time,
    wherein when the video units are switched,
    in fast forward reproduction,
    in said calculating of the elapsed jump time duration, the elapsed jump time duration is calculated as a difference between a reproduction time of a last displayed picture in a source video unit prior to the switching and an end time of the source video unit,
    in said calculating of the remaining jump time duration, the remaining jump time duration is calculated by subtracting the elapsed jump time duration calculated in said calculating of the elapsed jump time duration from the jump time duration corresponding to a designated speed, and
    in said calculating of the reproduction start time, the reproduction start time is calculated by adding the remaining time duration calculated in said calculating of the remaining time duration to a start time of a destination video unit, and
    in fast rewind reproduction,
    in said calculating of the elapsed jump time duration, the elapsed jump time duration is calculated as a difference between a reproduction time of a last displayed picture in a source video unit prior to the switching and a start time of the source video unit,
    in said calculating of the remaining jump time duration, the remaining jump time duration is calculated by subtracting the elapsed jump time duration calculated in said calculating of the elapsed jump time duration from the jump time duration corresponding to a designated speed, and
    in said calculating of the reproduction start time, the reproduction start time is calculated by subtracting the remaining time duration calculated in said calculating of the remaining time duration from an end time of a destination video unit.

2. The video reproduction method according to claim 1, further comprising
    calculating a switch correction time duration by multiplying a difference by a factor corresponding to the designated speed, the difference being between (a) an actual time of reproducing a picture to be last displayed in the source video unit prior to the switching and (b) an actual time of reproducing a picture to be first displayed in the destination video unit,
    wherein when the destination video unit is switched to a further destination video unit,
    in fast forward reproduction,
    said calculating of the reproduction start time further includes calculating the reproduction start time by adding the switch correct time duration calculated in said calculating of the switch correct time duration to a start time of the further destination video unit, and
    in fast rewind reproduction,
    said calculating of the reproduction start time further includes calculating the reproduction start time by subtracting the switch correct time duration calculated in said calculating of the switch correct time duration from an end time of the further destination video unit.

3. The video reproduction method according to claim 2, wherein in fast forward reproduction,
    said calculating of the reproduction start time further includes calculating the reproduction start time by adding (a) a sum of the remaining jump time duration and the switch correct time duration to (b) the start time of the destination video unit, and
    in fast rewind reproduction,
    said calculating of the reproduction start time further includes calculating the reproduction start time by subtracting (a) the sum of the remaining jump time duration and the switch correct time duration from (b) the end time of the destination video unit.

4. The video reproduction method according to claim 3, wherein when a sum of the remaining jump time duration and the switch correct time duration is longer than at least one of a reproduction time duration of the destination video unit and a total reproduction time duration of consecutive destination video units,
    in fast forward reproduction,
    in said reproducing, the one of the destination video unit and the consecutive destination video units is not reproduced, and
    said calculating of the reproduction start time further includes calculating the reproduction start time by adding a time duration to a start time of the one of the destination video unit and the consecutive destination video units, the time duration being calculated by subtracting (a) the one of the reproduction time duration of the destination video unit and the total reproduction time duration of the consecutive destination video units from (b) the sum of the remaining jump time duration and the switch correct time duration, and in fast rewind reproduction,
in said reproducing, the one of the destination video unit and the consecutive destination video units is not reproduced, and
said calculating of the reproduction start time further includes calculating the reproduction start time by subtracting the time duration from an end time of the one of the destination video unit and the consecutive destination video units, the time duration being calculated by subtracting (a) the one of the reproduction time duration of the destination video unit and the total reproduction time duration of the consecutive destination video units from (b) the sum of the remaining jump time duration and the switch correct time duration.

5. The video reproduction method according to claim 2,
wherein when the switch correction time duration calculated in said calculating of the switch correction time duration is longer than at least one of a reproduction time duration of the destination video unit and a total reproduction time duration of consecutive destination video units,
in fast forward reproduction,
in said reproducing, the one of the destination video unit and the consecutive destination video units is not reproduced, and
said calculating of the reproduction start time further includes calculating the reproduction start time by adding a time duration to a start time of the one of the destination video unit and the consecutive destination video units, the time duration being calculated by subtracting (a) the one of the reproduction time duration of the destination video unit and the total reproduction time duration of the consecutive destination video units from (b) the switch correction time duration,
in fast rewind reproduction,
in said reproducing, the one of the destination video unit and the consecutive destination video units is not reproduced, and
said calculating of the reproduction start time further includes calculating the reproduction start time by subtracting the time duration from an end time of the one of the destination video unit and the consecutive destination video units, the time duration being calculated by subtracting (a) the one of the reproduction time duration of the destination video unit and the total reproduction time duration of the consecutive destination video units from (b) the switch correction time duration.

6. The video reproduction method according to claim 1,
wherein when the remaining jump time duration calculated in said calculating of the remaining jump time duration is longer than at least one of a reproduction time duration of the destination video unit and a total reproduction time duration of consecutive destination video units,
in fast forward reproduction,
in said reproducing, one of the destination video unit and the consecutive destination video units is not reproduced, and
said calculating of the reproduction start time further includes calculating the reproduction start time by adding a time duration to a start time of the one of the destination video unit and the consecutive destination video units, the time duration being calculated by subtracting (a) the one of the reproduction time duration of the destination video unit and the total reproduction time duration of the consecutive destination video units from (b) the remaining jump time duration, and
in fast rewind reproduction,
in said reproducing, the one of the destination video unit and the consecutive destination video units is not reproduced, and
said calculating of the reproduction start time further includes calculating the reproduction start time by subtracting the time duration from an end time of the one of the destination video unit and the consecutive destination video units, the time duration being calculated by subtracting (a) the one of the reproduction time duration of the destination video unit and the total reproduction time duration of the consecutive destination video units from (b) the remaining jump time duration.

7. A video reproduction apparatus that performs at least one of fast forward reproduction and fast rewind reproduction by sequentially jumping one picture to another in video in a jump time duration corresponding to a designated speed when a reproduction unit is reproduced, the reproduction unit consisting of a plurality of connected video units each being a series of moving pictures, said video reproduction apparatus comprising:
an elapsed jump time duration calculation unit configured to calculate an elapsed jump time duration, the elapsed jump time duration being a time duration to be allocated to a source video unit prior to jumping, within a jump time duration for performing a jump across a video unit boundary in fast forward reproduction or fast rewind reproduction;
a remaining jump time duration calculation unit configured to calculate a remaining jump time duration based on the elapsed jump time duration, the remaining jump time duration being a time duration to be allocated to a destination video unit subsequent to the jumping, within the jump time duration for performing the jump across the video unit boundary in fast forward reproduction or fast rewind reproduction;
a reproduction start time calculation unit configured to calculate a reproduction start time based on the remaining jump time duration; and
a video reproduction unit configured to reproduce the video from the reproduction start time,
wherein when the video units are switched,
in fast forward reproduction,
said elapsed jump time duration calculation unit is configured to calculate the elapsed jump time duration as a difference between a reproduction time of a last displayed picture in a source video unit prior to the switching and an end time of the source video unit,
said remaining jump time duration calculation unit is configured to calculate the remaining jump time duration by subtracting the elapsed jump time duration calculated by said elapsed jump time duration calculation unit from the jump time duration corresponding to a designated speed, and
said reproduction start time calculation unit is configured to calculate the reproduction start time by adding the remaining time duration calculated by said remaining time duration calculation unit to a start time of a destination video unit, and
in fast rewind reproduction,
said elapsed jump time duration calculation unit is configured to calculate the elapsed jump time duration as a difference between a reproduction time of a last displayed picture in a source video unit prior to the switching and a start time of the source video unit,
said remaining jump time duration calculation unit is configured to calculate the remaining jump time duration by subtracting the elapsed jump time duration calculated by said elapsed jump time duration calculation unit from the jump time duration corresponding to a designated speed, and said reproduction start time calculation unit is configured to calculate, the reproduction start time by subtracting the remaining time duration calculated by said remaining jump time duration calculation unit from an end time of a destination video unit.

8. The video reproduction apparatus according to claim 7, further comprising a switch correction time duration calculation unit configured to calculate a switch correction time duration by multiplying a difference by a factor corresponding to the designated speed, the difference being between (a) an actual time of reproducing a picture to be last displayed in the source video unit prior to the switching and (b) an actual time of reproducing a picture to be first displayed in the destination video unit, wherein when the destination video unit is switched to a further destination video unit, in fast forward reproduction, said reproduction start time calculation unit is further configured to calculate the reproduction start time by adding the switch correct time duration calculated by said switch correct time duration calculation unit to a start time of the further destination video unit, and in fast rewind reproduction, said reproduction start time calculation unit is further configured to calculate the reproduction start time by subtracting the switch correct time duration calculated by said switch correct time duration calculation unit from an end time of the further destination video unit.

9. The video reproduction apparatus according to claim 8, wherein in fast forward reproduction, said reproduction start time calculation unit is further configured to calculate the reproduction start time by adding (a) a sum of the remaining jump time duration and the switch correct time duration to (b) the start time of the destination video unit, and in fast rewind reproduction, said reproduction start time calculation unit is further configured to calculate the reproduction start time by subtracting (a) the sum of the remaining jump time duration and the switch correct time duration from (b) the end time of the destination video unit.

10. The video reproduction apparatus according to claim 9, wherein when a sum of the remaining jump time duration and the switch correct time duration is longer than at least one of a reproduction time duration of the destination video unit and a total reproduction time duration of consecutive destination video units, in fast forward reproduction, said video reproduction unit is configured not to reproduce the one of the destination video unit and the consecutive destination video units, and said reproduction start time calculation unit is further configured to calculate the reproduction start time by adding a time duration to a start time of the one of the destination video unit and the consecutive destination video units, the time duration being calculated by subtracting (a) the one of the reproduction time duration of the destination video unit and the total reproduction time duration of the consecutive destination video units from (b) the sum of the remaining jump time duration and the switch correct time duration, and in fast rewind reproduction, said video reproduction unit is configured not to reproduce the one of the destination video unit and the consecutive destination video units, and said reproduction start time calculation unit is further configured to calculate the reproduction start time by subtracting the time duration from an end time of the one of the destination video unit and the consecutive destination video units, the time duration being calculated by subtracting (a) the one of the reproduction time duration of the destination video unit and the total reproduction time duration of the consecutive destination video units from (b) the sum of the remaining jump time duration and the switch correct time duration.

11. The video reproduction apparatus according to claim 8, wherein when the switch correction time duration calculated by said switch correction time duration calculation unit is longer than at least one of a reproduction time duration of the destination video unit and a total reproduction time duration of consecutive destination video units, in fast forward reproduction, said video reproduction unit is configured not to reproduce the one of the destination video unit and the consecutive destination video units, and said reproduction start time calculation unit is further configured to calculate the reproduction start time by adding a time duration to a start time of the one of the destination video unit and the consecutive destination video units, the time duration being calculated by subtracting (a) the one of the reproduction time duration of the destination video unit and the total reproduction time duration of the consecutive destination video units from (b) the switch correction time duration, in fast rewind reproduction, said video reproduction unit is configured not to reproduce the one of the destination video unit and the consecutive destination video units, and said reproduction start time calculation unit is further configured to calculate the reproduction start time by subtracting the time duration from an end time of the one of the destination video unit and the consecutive destination video units, the time duration being calculated by subtracting (a) the one of the reproduction time duration of the destination video unit and the total reproduction time duration of the consecutive destination video units from (b) the switch correction time duration.

12. The video reproduction apparatus according to claim 7, wherein when the remaining jump time duration calculated by said remaining jump time duration calculation unit is longer than at least one of a reproduction time duration of the destination video unit and a total reproduction time duration of consecutive destination video units, in fast forward reproduction, said video reproduction unit is configured not to reproduce one of the destination video unit and the consecutive destination video units, and said reproduction start time calculation unit is further configured to calculate the reproduction start time by adding a time duration to a start time of the one of the destination video unit and the consecutive destination video units, the time duration being calculated by subtracting (a) the one of the reproduction time duration of the destination video unit and the total reproduction time duration of the consecutive destination video units from (b) the remaining jump time duration, and in fast rewind reproduction, said video reproduction unit is configured not to reproduce the one of the destination video unit and the consecutive destination video units, and said reproduction start time calculation unit is further configured to calculate the reproduction start time by subtracting the time duration from an end time of the one of the destination video unit and the consecutive destination video units, the time duration being calculated by subtracting (a) the one of the reproduction time duration of the destination video unit and the total reproduction time duration of the consecutive destination video units from (b) the remaining jump time duration.

* * * * *